United States Patent [19]

Reiss, III

[11] Patent Number: 5,528,674
[45] Date of Patent: Jun. 18, 1996

[54] COMBINED ACTIVATION APPARATUS AND VOICE MESSAGE SOURCE FOR EMERGENCY BROADCAST SYSTEM BROADCAST

[75] Inventor: Arthur B. Reiss, III, New Lenox, Ill.

[73] Assignee: R.E.I.S. Inc., New Lenox, Ill.

[21] Appl. No.: 206,882

[22] Filed: Mar. 7, 1994

[51] Int. Cl.$^6$ .......................... H04M 11/00; H04M 11/08
[52] U.S. Cl. .......................... 379/102; 379/104; 379/105; 379/41; 379/48
[58] Field of Search .......................... 379/102, 104–106, 379/37, 41, 48, 49, 97, 98

[56] References Cited

U.S. PATENT DOCUMENTS

| | | |
|---|---|---|
| 2,779,868 | 1/1957 | Rust . |
| 2,922,142 | 1/1960 | Lappin . |
| 3,124,749 | 3/1964 | Craig . |
| 4,393,277 | 7/1983 | Besen et al. ............................ 379/104 |
| 4,481,671 | 11/1984 | Mätzold . |
| 4,518,822 | 5/1985 | Martinez .................... 379/48 |
| 4,872,195 | 10/1989 | Leonard .................... 379/104 |

*Primary Examiner*—Wing F. Chan
*Attorney, Agent, or Firm*—Leydig, Voit & Mayer, Ltd.

[57] ABSTRACT

A remotely activated broadcast transmitter control uses an existing telephone link to a remote control for initiating, controlling and carrying out an emergency broadcast system (EBS) activation, including placing an EBS tone on the transmitter, and coupling the telephone line to the transmitter so that a voice message can be spoken into the remote telephone. A telephone input receives a telephone signal, which is selectively coupled to a remote control and an audio bus via a first switch. A program audio input receives a studio audio signal, and an audio output is coupled to the transmitter. A tone input receives the emergency tone. A second switch is connected to the audio bus and the program audio input for selectively placing the audio bus signal and the studio audio signal on the audio output. A third switch is connected to the second switch output, to the tone input, and to the audio output, and selectively places the emergency tone, the audio bus signal and the studio audio signal on the transmitter. Control electronics are connected between the remote control and the three switches, and is responsive to a signal from the remote control to output control signals to the switches to sequentially place the telephone line signal on the audio bus, to place the emergency tone on the transmitter, to place the audio bus signal on the transmitter, to place the studio program signal on transmitter, and to return the telephone signal to the remote control.

15 Claims, 3 Drawing Sheets

COMBINED ACTIVATION APPARATUS AND VOICE MESSAGE SOURCE FOR EMERGENCY BROADCAST SYSTEM BROADCAST

FIELD OF THE INVENTION

The invention relates generally to remote control of a broadcast radio transmitter, and more particularly, to remote activation of an emergency signal and voice message through that transmitter.

BACKGROUND OF THE INVENTION

Many commercial radio stations are now fully automated. The programming consists of pre-recorded words and/or music which are sent from a remote studio site to a favorably located transmitter. More traditional radio stations are also still in existence, where live programming is generated at a studio site and sent to a remote, favorably located transmitter. Under FCC regulations, monitoring and control of the transmitter must be performed under human supervision. This is true both in the case of automated radio stations and traditional live-broadcast stations. At one time, such transmitter control was performed by an engineer or other operator located at the transmitter site. Presently, however, almost all transmitter monitoring and control is performed remotely. That is, an engineer or other operator is located at a site remote from both the studio and the transmitter. Monitoring of the broadcast signal is simply achieved by having a conventional radio tuned to the broadcast frequency of the station. However, certain transmitter operating parameters must be directly read and, if necessary, adjusted to meet FCC regulations. This monitoring and control is achieved by means of some form of remote control. One example of such remote control is by means of a dial-in telephone control.

Since dial-in systems are representative of the type of remote transmitter control presently used in the radio industry, their operation will be described in some detail. The transmitter site typically includes a dial-in remote control which can be accessed by a conventional telephone. Once a standard telephone connection is made, a password is entered by the operator keying the password on a standard telephone keypad. Once verification of a correct password has occurred, the remote operator can then poll the remote control for certain transmitter operational parameters and also, if necessary, raise or lower those parameters to meet FCC specifications. An example of such a parameter is the power output of the transmitter. In order to read the present power output, the remote operator would press a number on the telephone keypad that has been pre-determined to correspond to power output. Upon the pressing of that key, the remote control at the transmitter is designed to take the reading, and illustratively, to formulate a voice message representative of the power output for transmission to the operator via the telephone connection. Under FCC regulations, the operator must record the power output and other transmitter electrical levels on a periodic basis.

If, upon taking of such readings, it is determined that the plate voltage or other parameter is at an improper level, the dial-in system can also be used to change that level. Typically, the "*" key is programmed to lower whichever transmitter electrical level is selected. Similarly, the "#" is used to raise a level. Thus, in order to raise the plate voltage, the operator would first press the numerical key pre-determined to represent plate voltage, and subsequently, press the "#" key to raise the plate voltage. The remote control at the transmitter site is adapted to raise the plate voltage a certain amount for each time the "#" key is pressed. In this way, the remote operator can both take the required readings of the transmitter and also adjust any levels as necessary.

In addition to monitoring and controlling operational parameters at the transmitter, FCC regulations also require human involvement in broadcast of the emergency broadcast system (EBS) warning. In a typical remote operator situation, the operator monitors both the station for which he is responsible, and a primary EBS station in the geographic area. The primary EBS station is typically notified by the proper governmental authority that an impending natural disaster requires activation of the EBS system. The primary EBS station then performs what will be referred to as an "EBS activation" wherein the station broadcasts the familiar EBS tone followed by a voice message giving warnings about the disaster, or other important information or instructions. In turn, the non-primary stations in the same area are supposed to respond by broadcasting their own EBS tone and voice message. Upon hearing the EBS signal from the primary station, the remote operator of a non-primary EBS station has the option of either recording the primary station's EBS voice message, or of formulating his own.

At this point, the remote operator has the necessary voice message and is ready to initiate an EBS activation. However, since the remote operator is typically remote both from the transmitter and the studio, if any, he has no way to activate the EBS emergency signal nor to place the voice message on the transmitter. Typically, the remote operator must notify other station personnel and direct them to proceed to the studio site and activate the EBS system. In many situations, the two-tone generator for EBS is located at the transmitter. However, the voice message must presently be sent from the studio site where microphones for that purpose are located. Such a procedure is time-consuming since the person who goes to the studio for the purpose of activating EBS and sending out the voice message loses valuable time in travelling to the studio. Further, EBS activation may be necessary at inconvenient times, such as in the middle of the night. Further still, travel to the studio during periods when EBS is necessary may be dangerous due to the prevailing weather conditions or the like which are giving rise to the need for an EBS activation. These delays and inconveniences may result in EBS activation that is untimely. Even worse, EBS activation may not occur at all.

SUMMARY OF THE INVENTION

It is thus a primary aim of the invention to provide a simpler and more convenient means of EBS activation than has been provided heretofore.

In furtherance of that aim, it is a primary object of the present invention to provide for EBS activation at sites remote from the transmitter and studio.

It is a related object of the invention to eliminate the need for EBS activation to originate from the studio.

It is a further object of the invention to provide a remote EBS activation system which can be integrated into existing transmitter control systems.

An even further object is providing a remote EBS activation system which has reliable operation and includes advantageous safety and security features.

It is a feature of the invention that the established data link to a radio transmitter is used for performing EBS activation.

It is a related feature that the invention uses the established data link both to initiate the EBS tone, and to serve as the source of the required voice message.

A further feature of the invention is that the remote EBS activation system resides in the background of the transmitter control until the system is activated by a remote operator.

An even further feature of the invention is that the remote EBS activation system includes subsystems for preventing accidental or unauthorized EBS activation.

In accordance with these and other objects of the invention, there is provided a remotely activated broadcast transmitter control which uses an existing data link to a remote control for initiating, controlling and carrying out an EBS activation including placing an EBS tone on the transmitter, and coupling the telephone line to the transmitter so that the voice message can be spoken into the remote telephone. The remotely activated broadcast transmitter control includes a telephone input for receiving a telephone signal, the telephone signal being selectively coupled to the remote control. A first switch is connected to the telephone input for switching the telephone signal between the remote control and an audio bus. A program audio input is included for receiving a studio audio signal. An audio output is also provided, and is coupled to the transmitter for delivering the signals applied thereto to the transmitter. A tone input receives the emergency tone. A second switch is connected to the audio bus and the studio program input for selectively placing the signal on the audio bus and the program input signal on an output. A third switch is connected to the second switch output, to said tone input, and to said audio output. This third switch selectively places the emergency tone, the audio bus signal and the studio program signal on the transmitter. Control electronics are connected between the remote control and the first, second and third switches. The control electronics are responsive to a signal from the remote control to output control signals to the switches to sequentially place the telephone line on the audio bus, place the emergency tone on the transmitter, place the audio bus on the transmitter, place the studio program signal on transmitter, and return the telephone signal to the remote control.

The invention will be best understood in reference to the description and claims below, when considered in combination with the drawings, wherein:

DETAILED DESCRIPTION OF THE PREFERRED EMBODIMENTS

Figure 1:
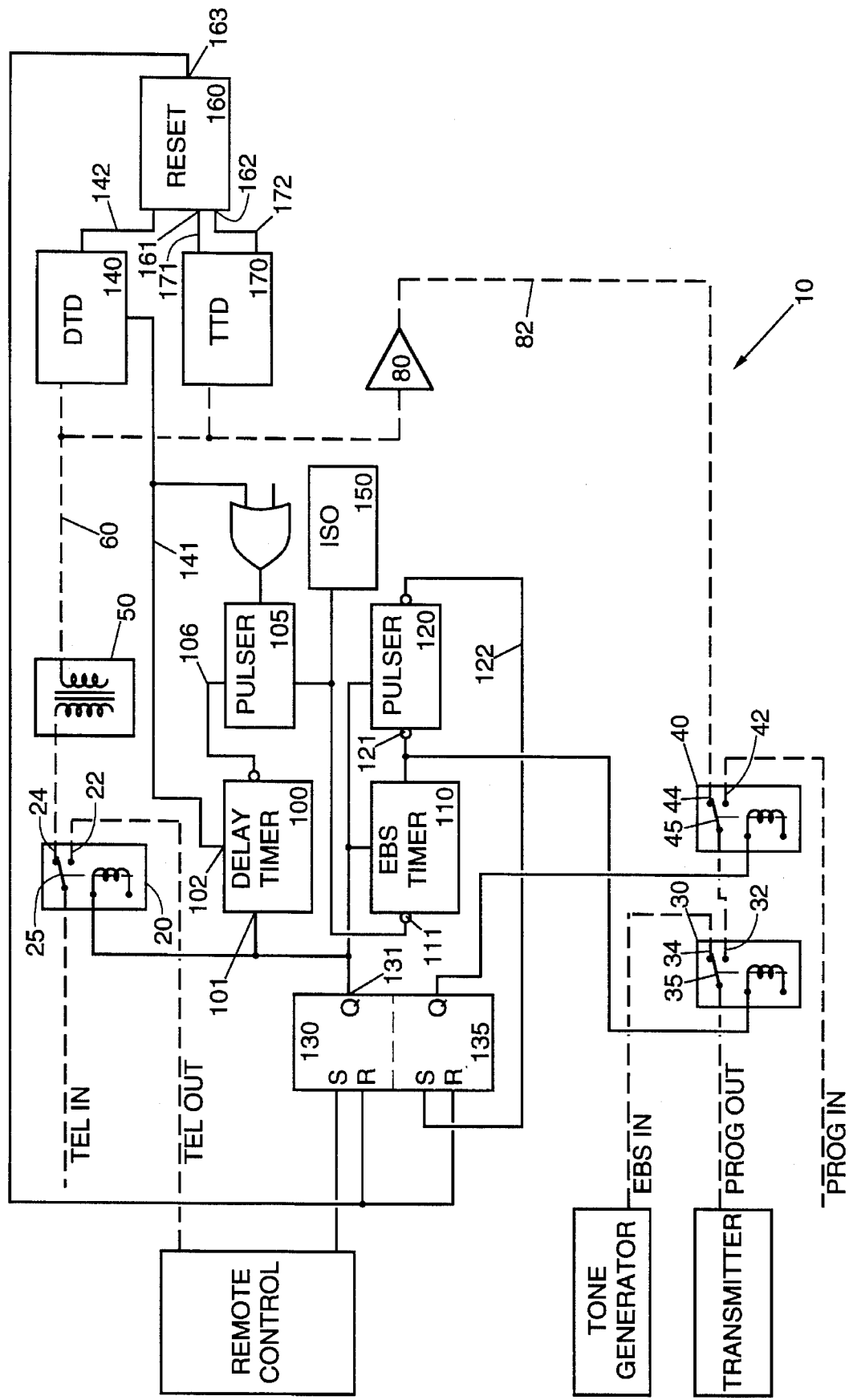
FIG. 1 is a block diagram of an EBS system according to one embodiment of the invention.

A block diagram of a remotely activated EBS system according to the present invention is shown in FIG. 1. That figure shows the various components making up the system in block form, with the audio signal path depicted in broken lines and the electrical control path depicted in solid lines.

A brief overview of the EBS system will be presented before discussing its components in further detail. The EBS system 10, according to the invention, is adapted to make use of an existing telephone line data link between a remote operator and a remote control for a radio transmitter for initiation and control of an EBS activation. Since the EBS system 10 resides between the telephone line and the conventional dial-in transmitter remote control (shown as a functional block in FIG. 1), it is designed to normally provide loop-through operation wherein the EBS system 10 passes the signal on a telephone input to the dial-in transmitter remote control. This allows the conventional remote control functions to be performed.

When an EBS activation is necessary, the remote operator keys a particular control code onto the keypad of the telephone, which code is passed to the remote control. Each control code in the remote control is tied to its own individual relay, and each relay controls one function of one piece of equipment in the transmitter facility. In installing EBS system 10, the technician wires a previously unused relay to the control input terminals of the system 10, the shorting of which activates the system. Thus, the remote control is responsive to receipt of the EBS code sent by the operator to initiate operation of the EBS system 10. Once the EBS system 10 begins operation, the telephone signal is placed on the audio bus of the EBS system while the EBS tone is placed onto the transmitter's air signal. The placing of the telephone signal on the audio bus serves several purposes. First of all, it allows use of the remote telephone to provide control signals to the EBS system. It also allows use of the remote telephone for broadcast of the voice message portion of an EBS activation following the transmission of the EBS tone.

Once the operation of the EBS system 10 is initiated, and the telephone signal is placed on the audio bus, the EBS system 10 begins a timing sequence during which the various operations of an EBS activation are performed. The timing sequence begins with a delay period, during which EBS system 10 verifies that its activation was not accidental. Following this, the EBS system 10 places the EBS tone on the air for the required duration. Then, the telephone signal from the audio bus is placed on the air, so that the voice message of the EBS activation can be spoken into the remote telephone and broadcast. Following that, the remote operator keys an off-code on the telephone keypad. The EBS system 10 is responsive to this off-code for returning to the normal loop-through operation, and for returning the studio program to the air. In this way, the EBS system 10 makes use of the existing telephone data link for EBS activation, including initiating the EBS tone and serving as the source of the required voice message. Further, the existing data link also serves as the source of control signals to the EBS system.

In review, the EBS system 10 is normally in a loop-through mode where signals from the telephone line are simply passed to the dial-in remote control. Upon activation of the system 10, and verification of the accuracy of the activation, an EBS tone is generated and then the telephone signal is placed on the air for the purpose of broadcasting the accompanying voice message. The system 10 is then returned to loop through operation, and the studio signal is placed back on the air. The components of the EBS system 10 for providing this function, and additional functions and features will now be described.

The EBS system 10, according to this embodiment, utilizes a series of switches in the form of relays for the purpose of manipulating the various audio signals to achieve the above-described operation. Other control electronics within EBS system 10 serve to control the operation of these three relays which are represented in FIG. 1 by reference numerals 20, 30 and 40.

To determine whether the telephone line is looped-through to the remote control, or whether it is applied to the audio bus, a first switch in the form of relay 20 is used. The telephone line, referred to herein as TEL IN is coupled to the throw 25 of the relay 20. Contact 22 of relay 20 is coupled to a signal line referred to as TEL OUT. This signal line is connected to the dial-in remote control. The other contact, 24, of relay 20 is connected indirectly to the audio bus 60 through a transformer 50, which will be discussed below. Thus, by controlling the position of throw 25 of relay 20 between contact 22 and 24, EBS system 10 can be set for either loop-through operation, or for placing the TEL IN signal on the audio bus.

To provide for selectively placing either the studio program signal, the EBS tone, or the telephone signal on the audio bus on the program output, a combination of second and third switches in the form of relays 40 and 30, respectively, is used. The two relays 30, 40 are coupled together by means of the throw 45 of relay 40 being connected to one of the contacts 32 of the relay 30. The throw 35 of relay 30 is connected to the signal line PROG OUT which is representative of the broadcast signal that is sent to the transmitter (represented by a functional block in FIG. 1), and which represents the audio output of EBS system 10. Thus, whatever signal is applied to the throw 35 of relay 30 will be broadcast. One of those signals is the program audio input representing the normal studio signal, and shown herein on signal line PROG IN. PROG IN is coupled to contact 42 of the relay 40. Thus, with both relays in their inactivated states (or down position in the sense of FIG. 1), the PROG IN signal is applied to the PROG OUT signal line. The EBS tone may also be applied to the PROG OUT signal line. The EBS tone is present on a tone input, represented herein on signal line EBS IN. Line EBS IN is coupled to contact 34 of the relay 30. Thus, with the relay 30 activated the EBS tone is broadcast. The remaining possible source of a broadcast signal is the voice message line 82, representing the signal on the audio bus 60 as amplified by amplifier 80. The voice message line 82 is used to broadcast the voice message portion of an EBS transmission. The contact 44 of relay 40 is coupled to line 82. Thus, with relay 40 activated, and relay 30 inactivated, the signal on voice message line 82 is connected to PROG OUT and broadcast.

When the EBS system 10 is in its inactive state, both relays 30 and 40 are in their inactive state, with their throws 35 and 45 in the down position. As a result, the signal PROG IN is applied to signal line PROG OUT. Following activation of the system 10, relay 30 is activated, moving throw 35 to contact 34. At this time, the EBS two-tone signal is applied to the line PROG OUT. Following that, the throw 35 of relay 30 is returned to contact 32 and relay 40 is activated so that its throw 45 moves to contact 44. As a result of this, the signal on voice message line 82 is applied to signal line PROG OUT, and the voice message being spoken by the remote operator into the telephone is broadcast. At the end of an EBS activation, relay 40 is deactivated and the throw 45 returned to contact 42 so that the normal studio program on line PROG IN is broadcast by being applied to the signal line PROG OUT.

Thus, by control of the relays 20, 30, 40, the necessary manipulation of the audio signals is performed. The EBS system 10 according to this embodiment includes control electronics for controlling the activation of the relays. Although not shown in the block diagram of FIG. 1, activation of the three relays 20, 30, 40 is preferably achieved by applying a logic high voltage to the base of a 2N3055A transistor with its emitter tied to ground. This activates the transistor, the collector of which is tied to the coil of the relay, thus causing relay activation. According to the present embodiment, Form 2C (double-pull, double throw) relays are used. It should be noted that the simplified block diagram of FIG. 1 shows all of the audio signals as a single line. In actuality, the signals from the studio and to the transmitter are stereo, balanced (that is, two wires per channel) audio paths; that is, a total of four audio signal lines are used, two for left channel and two for right. As a result, the relays signified as 30 and 40 in the diagram will actually be two relays apiece to handle the stereo audio source from the studio. Relay 20, however, will be a single Double Pole-Double Throw relay, since the telephone line is itself a monaural audio source. As a result, the relays 20, 30, and 40 all have two throws and two sets of contacts—one for each line of a given audio signal. The details of the control electronics, which provide the necessary control of the relays as well as other advantageous security and safety features, will now be discussed.

A series of timer elements provide the necessary control signals for properly activating and deactivating the relays 20, 30, 40, as discussed above. The control of these timers is, in turn, controlled by a set of flip flops 130 and 135. Illustratively, these flip flops all reside on a single CD4044 chip. The three timers are shown in FIG. 1, and are designated by reference numerals 100, 110 and 120. According to the convention of the block diagram of FIG. 1, the inputs along the top of each timer represent enabling inputs, while the inputs along the left side of each timer represent triggering inputs. The output from each timer is shown at the right hand side. Thus, it can be seen that the three timers 100, 110, and 120 are cascaded with the output of timer 100 serving to trigger timer 110, and the output of trigger 110 serving to trigger timer 120.

Both initial activation of the EBS system, and initiation of the timing sequence are controlled by the flip flop 130. The set input (S) of flip flop 130 is connected to the conventional dial-in remote control. When the remote control receives the EBS activation code keyed onto the telephone by the remote operator, the remote control brings this input low, thus setting flip flop 130, and causing its output Q to go high. This high output serves as an initiation signal to the EBS system 10, and will be referred to herein as the START signal. The signal START serves two functions. First of all, it activates relay 20 and puts signal TEL IN on the audio bus 60. Secondly, START also initiates the timing sequence of the EBS system. START is applied as a triggering input to timer 100. At the same time, it is also applied as the enabling input to timer 110 and 120.

To prevent accidental initiation of an EBS activation, the first element in the timing sequence is a delay timer. An accidental activation could occur under a variety of circumstances where the set (5) input of flip flop 130 is brought low. If the initiation is accidental, a dial tone will be present on the line TEL IN. The function of delay timer 100 is to provide a delay during which EBS system 10 determines whether a dial tone is present on TEL IN. If so, further operation of the EBS system 10 is stopped. If not, the EBS activation proceeds. The actual detection of the dial tone is performed by a dial tone detector 140, the operation of which will be discussed in greater detail below. When dial tone detector 140 detects a dial tone, it generates a positive-going pulse at output 141. Line 141 is connected to the enable input 102 of the delay timer 100. If delay timer 100 receives such a pulse during the delay period, the triggering output to timer 110 is never generated. If there is no dial tone, however, the timing sequence continues.

The output of delay timer 100 is also connected to an optoisolator 150. The EBS system 10 is adapted either for use with an on-board EBS tone generator, or with an external tone generator (both of which are represented as a functional block in FIG. 1). When an external EBS generator is used, such as a Gorman-Redlich Model CEB EBS tone generator, it may require an activation signal of a certain minimum duration. In the case of a Gorman-Redlich generator, it must receive a signal of at least a half second duration so-that the generator may transmit the EBS tone for the length of time required under FCC regulations. Thus, part of the function of the delay timer 100 is providing the necessary activation signal to the external generator. According to this embodiment, this is achieved by applying the output of the delay timer 100 to the optoisolator 150. The optoisolator, in turn, applies the appropriate activation signal to the external generator.

Figure 2:
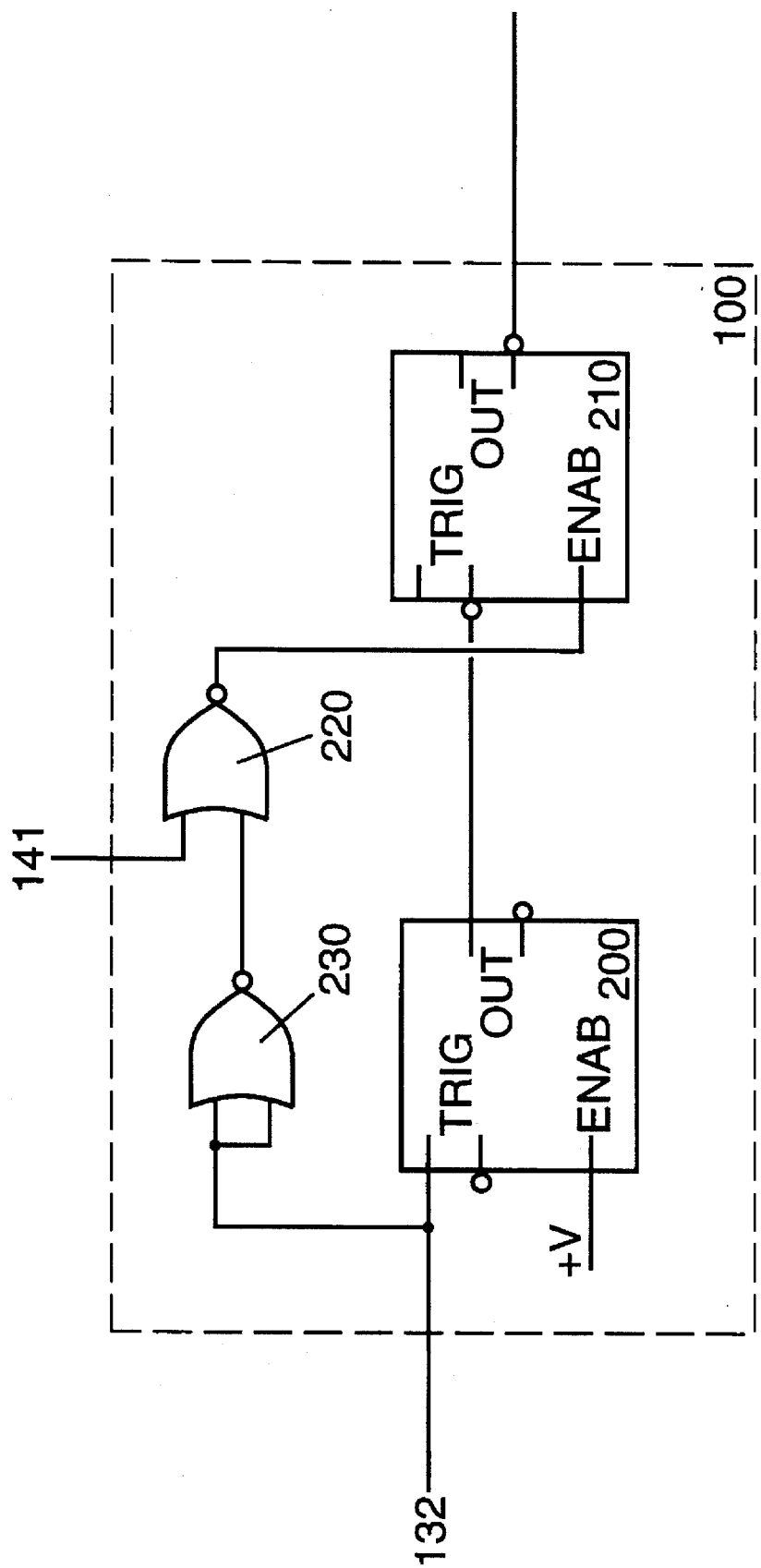
FIG. 2 is a partial schematic of a delay timer for an EBS system according to an embodiment of the invention.

The partial schematic of FIG. 2 shows the components making up delay timer 100 according to the preferred embodiment. As can be seen, delay timer 100 is comprised of two timers 200 and 210, each forming half of a CD4538 dual precision monolithic timer. Each timer includes an ENABLE input, and an inverting and a non-inverting TRIGGER input, and are edge-triggered. If a timer is enabled, the falling or rising edge of an input-signal (depending on whether the inverting or non-inverting input is used) will cause the timer to generate an output signal. Since the timers include both inverting and non-inverting outputs, the output signal will either be positive-going or negative-going, respectively. Further, each timer includes timing inputs, across which resistive and capacitive elements can be connected to set the time duration of timer operation.

Returning to FIG. 2, the ENABLE input of timer 200 is connected to the positive rail (+V) of the EBS system 10, meaning timer 200 is always active when the EBS system 10 is powered. The TRIGGER input of timer 200 is connected to the line 132 which carries the signal START. Thus, generation of the START signal causes timer 200 to begin operation. Illustratively, timer 200 will time-out after 1 second. The duration of this timer may be set to a smaller value depending upon, for example, the talk load of the phone system. My experimentation has revealed that a 1 second duration is a conservative value which was selected to ensure proper operation. At the end of this duration, the falling edge of the non-inverted output signal from the output of timer 200 is applied to the inverting TRIGGER input of timer 210. Assuming timer 210 is enabled, this triggering will generate an output signal at the inverting output of timer 210. The ENABLE input of timer 210 is connected to the output of NOR gate 220. The inputs to NOR gate 220 are an inverted START signal (inverted by NOR gate 230), and output 141 from the dial tone detector. As mentioned, 141 carries a positive-going pulse when a dial-tone has been detected, indicating an improper EBS activation. In that situation, NOR gate 220 has one input low, and the other high meaning that its output will be low, and that timer 210 will not be enabled. If, however, 141 is low (meaning a dial-tone has not been detected) both inputs to the NOR gate 220 are low, and the timer 210 is enabled when the triggering signal is received from the timer 200.

If no dial tone is detected and timer 210 fires, the timing sequence of EBS system 10 continues. The inverted output of timer 210 is used, and is connected both to the optoisolator 150 and the next timer 110 (see FIG. 1). Timer 210 is set for a half-second duration, so that the negative-going output will drive the optoisolator 150 for the time required to properly activate the external EBS generator. Returning now to FIG. 1, this same falling edge is presented to the inverting input 111 of timer 110. Receipt of this signal triggers timer 110, which is enabled by the START signal from flip flop 130. The positive going pulse caused by the firing of timer 110 fires relay 30 (through a 2N3055A transistor, not shown), which places the signal EBS IN on the line PROG OUT, thereby broadcasting the EBS tone on the transmitter. As mentioned previously, the source of this EBS tone may either be from an external tone generator (as activated by optoisolator 150), or from an on-board tone generator (not shown). The duration of the EBS tone is determined by setting the duration of EBS timer 110. According to present FCC regulations, the duration is required to be between 20 and 25 seconds. Proposed changes to those regulations would reduce this time between 8 and 12 seconds. The EBS system 10 may include a jumper arrangement to allow selectivity between an 8 or 20 second EBS tone.

According to the normal progression of events in an EBS activation, the EBS tone should be followed by transmission of the voice message. This is achieved in EBS System 10 by the falling edge of the output signal from the timer 110 first firing timer 120. The output from the timer 110 is applied to the inverting trigger input 121 of timer 120. Timer 120 is itself merely a pulser whose sole job is to set flip-flop 135. Flip-flop 135 is a level-triggered device instead of an edge-triggered device like most of the other logic in this circuit. Since timer 120 is normally enabled when the output of flip-flop 130 is high, it will usually accept the output of timer 110 and thereby set flip-flop 135 on its output 122. If, however, a dial tone has been detected by dial tone detector 140, the output of delay timer 100 is aborted at its enable input 102. Furthermore, through gates, the output of pulser 105, which is connected by line 106 to the output of delay timer 100, is also brought low, thus ensuring that the falling edge of any output pulse from the delay timer 100 is moot. In that manner, the EBS timer 110 is not set off, and the following pulser 120 is not activated either, and thus no set pulse arrives at flip-flop 135 to activate it.

If a dial tone is not detected, however, a pulse from pulser 120 is received at the set input to flip-flop 135, the Q output of 135 goes high thus activating relay 40. Since relay 30 is now deactivated (the output of timer 110 is low), this activation of relay 40 places the voice message line 82 into the signal line PROG OUT. Thus, the remote operator can speak the EBS voice message into the telephone, and have it broadcast. Since relay 40 is activated by a flip flop, it will stay activated until that flip flop 135 is reset.

To provide for resetting of flip flop 135, and thus resetting of the entire EBS system 10, a reset circuit 160 is provided. Upon receipt of proper inputs, to be discussed in detail below, the reset circuit 160 outputs a negative-going pulse at output 163, a signal which will be referred to herein as RESET. This RESET signal is applied to the reset (R) inputs of both flip flops 130 and 135. This causes their Q outputs to go low. A low signal at output 131 of flip flop 130 deactivates relay 20, and returns EBS system to loop-through operation, wherein the TEL IN signal is applied to the TEL OUT line connected to the dial-in remote. The resetting of flip flop 135 by signal RESET also deactivates relay 40, and returns the studio signal PROG IN to the line PROG OUT. Thus generation of the RESET signal returns the EBS system to normal operation.

The EBS system is designed to generate this RESET signal in one of two situations. In the first situation, the remote operator keys in an EBS off-code onto the telephone keypad. The EBS system 10 is responsive to the receipt of the off-code for generating the RESET signal. In the second situation, the EBS system 10 senses a dial tone on the audio bus, indicating either a false activation or the fact that the operator hung-up the telephone without first deactivating the system by use of the off-code. In response, the RESET signal is generated.

To provide the off-code function referred to above, the EBS System includes a touch-tone detector 170. As can be seen from FIG. 1, touch-tone detector 170 is coupled to the audio bus 60. The EBS off-code keyed in by the remote operator is thus applied to the touch-tone detector 170. Illustratively, the EBS off-code comprises two digits although it could be more. Upon receipt of the first digit, touch-tone detector 170 outputs a negative-going pulse on output 171. Similarly, upon receipt of the second digit, a negative-going pulse is placed on output 172. Receipt of these two signals by reset circuit 160 at its inputs 161 and 162, respectively, results in the RESET signal being generated.

Figure 3:
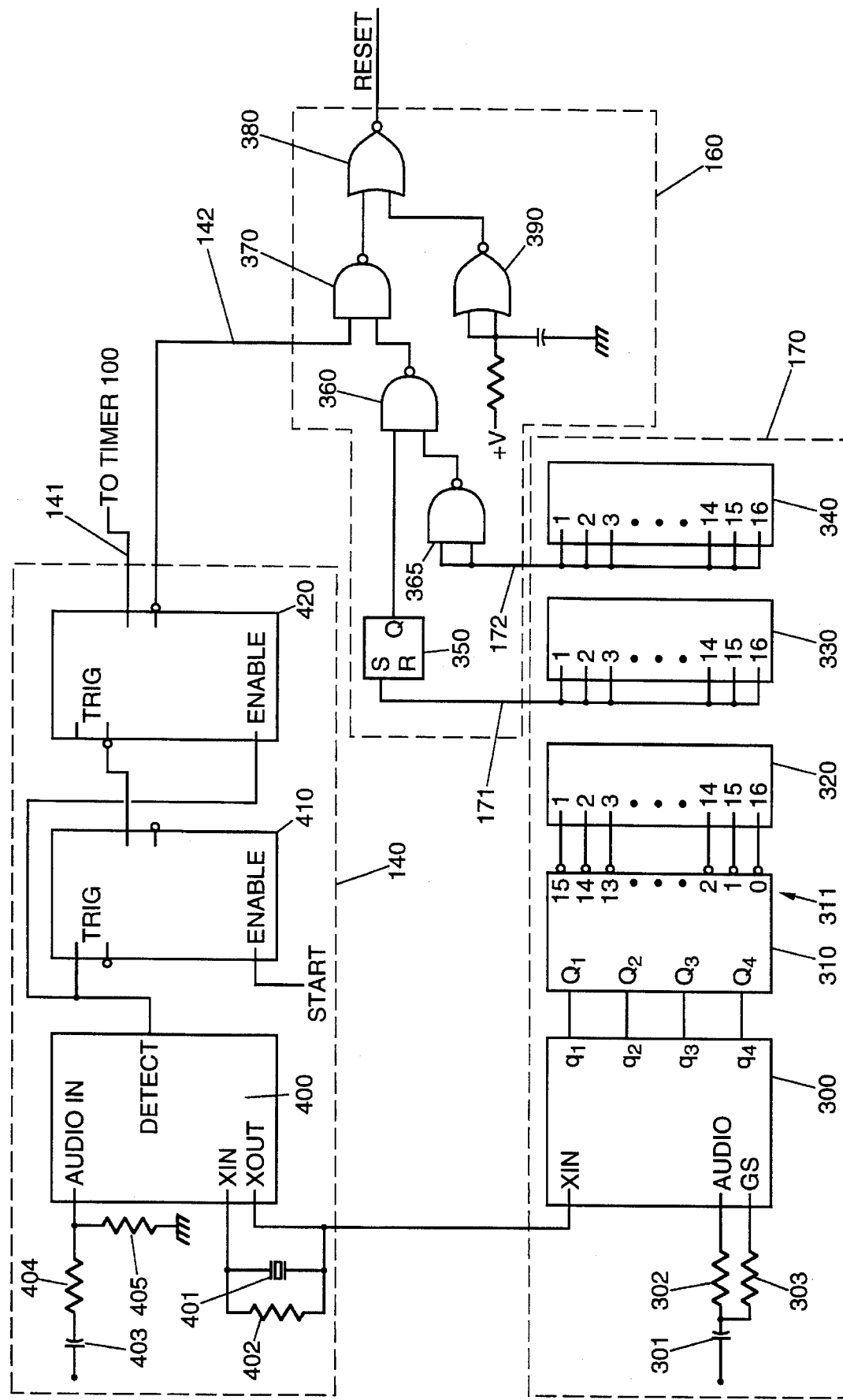
FIG. 3 is a partial schematic of the dial-tone detector, touch-tone detector, and reset circuit of an EBS system according to one embodiment of the invention.

The detailed function of the touch-tone detector 170 and reset circuit 160, according to this embodiment of the invention, will be discussed with reference to FIG. 3. Since the operation of the dial-tone detector 140 is closely related to the function of the reset circuit 160, its operation will also be discussed. The function of touch-tone detector 170 centers around operation of a touch-tone decoder 300. Illustratively, this decoder is a Teltone brand M8870. Decoder 300 is connected to the audio bus 60 at its AUDIO input, in the unbalanced mode, through a coupling capacitor 301 (illustratively 0.47 pF) and resistors 302 and 303 (100K each). The decoder 300 also requires a precise 3.579545 MHz RF signal to operate. This signal, which is also required for operation of the dial-tone detector 400, is coupled to the XIN input of the decoder 300. When decoder 300 detects any touch-tone signal, the output lines $q_1$-$q_4$, which are arranged in the BCD format, go high. These output lines are in turn connected to inputs $Q_1$-$Q_4$ of a 4 to 16 line decoder 310. Illustratively, this decoder is a 74LS154 decoder. Decoder 310 converts the BCD signal to a normal decimal digit, and sends the appropriate output line 311 active low. Each output 311 is tied to one pin of a pin strip 320, located in close physical proximity to decoder 310. Two other pin strips 330 and 340 are also located in the same area, and have all of their pins connected together to form one bus. A jumper is connected between the pin on 320 corresponding to the first digit of the EBS off-code and any pin on 330. Another jumper is connected between the pin on 320 corresponding to the second digit of the EBS off-code and any pin on 340. In this way, keying in of the first digit of the off-code by the remote operator places a negative-going output pulse on the output bus 171 of pin strip 330. Keying of the second digit similarly places a negative-going pulse on output bus 172 of strip 340 low.

The two signals from the output buses 171 and 172 are applied to the reset circuit 160. The low pulse on bus 171 is applied to the set (S) input of a flip flop 350, sending its output high. This high signal holds one input of NAND gate 360 high, and prepares that gate for activation. The low pulse from bus 172 is first inverted to a positive-going pulse by NAND gate 365, which is configured as an inverter, which pulse is then applied to the other input of gate 360. This activates that gate, and causes it to output a negative-going pulse, The output of 360 is connected to one input of another NAND gate 370. The other input of the NAND gate is connected to the output 142 of the dial tone detector, which is normally held high. The presence of a high level and a negative-going pulse on the inputs of NAND gate 370 causes it to output a positive-going pulse. This pulse is inverted by a NOR gate 380 having one of its inputs held low by a further NOR gate 390. This inverted, negative-going pulse is the signal RESET, previously referred to.

The function of the reset circuit 160, with respect to the dial-tone detector 140, is similar. If a dial tone is detected, the detector generates a negative-going pulse on output 142. This pulse is applied to one input of the NAND gate 370. Since its other input is usually held high, this pulse causes gate 370 to output a positive-going pulse, which is inverted by gate 380 to generate the RESET signal. Thus, detection of a dial tone by detector 140, at any time during activation of EBS system 10, results in the System being reset.

The function of the dial-tone detector 140 centers on the operation of a Teltone brand M980 non-precise detector 400. As mentioned previously, one function of dial-tone detector 140 is initially ensuring that the activation of EBS system 10 was not accidental. At the same time, the dial-tone detector 140 also serves to shut down EBS system 10 if a dial-tone is detected at any other time during the operational sequence of the system 10. However, the detector 400, is subject to a certain amount of "falsing" since it is a non-precise detector. That is, some components of human speech, which will be present on audio bus 60 of the EBS system 10 (see FIG. 1), can trigger the detector 400. Such false activations of detector 400, however, are limited in duration to half a second. As a result, the accuracy of a dial-tone detection by detector 400 is verified by means of a timing circuit. The timing circuit ensures that any "dial-tone" detected by detector 400 lasts longer than half a second, and is thus "real".

Before the timing circuit associated with detector 400 is described, the operation of detector 400 will be discussed. Detector 400 requires an accurate 3.579545 MHz RF signal to operate. This signal is provided by a 3.58 MHz crystal 401, along with a bias resistor 402 (illustratively 1M). This signal is applied to the XIN input of detector 400. The same signal is also provided to the touch-tone detector 300, as previously-described. The audio input to detector 400 is feed through a coupling capacitor 403 (illustratively 0.47 pF) and a voltage divider consisting of resistors 404 and 405 (both 10K). The audio signal is applied to detector 400 at the AUDIO IN input.

Detection of any audio approximating a dial tone causes the DETECT output of detector 400 to go high. This DETECT output is connected to the TRIGGER input of timer 410. Timer 410 is enabled by the signal START generated by flip flop 130 (see FIG. 1) upon activation of EBS system 10. If timer 410 is enabled, a high DETECT signal will cause the non-inverting output OUT of the timer to go high. The high DETECT level from the detector 400 is also applied to the ENABLE input of a second timer 420. The output from timer 410 is connected to the inverting TRIGGER input of timer 420. Thus, if the DETECT signal is still high when the timer 410 times out and presents a falling edge to timer 420, timer 420 will be fired and will output signals on both its non-inverting output 141, and its inverting output 142. The progression of these signals has been discussed previously. If, however, the DETECT signal from detector 400 goes low before timer 410 times out, timer 420 will never fire. Thus, the time duration setting of timer 410 determines how long a dial-tone must actually be present on audio bus 60 before the system will be reset. Since "falsing" of the detector 400 is always of less than a half second in duration, timer 410 is illustratively set for half second duration. The timer 420 is also set for a time duration of a half second, in order that its outputs will properly activate the other components to which the outputs are connected.

Now that the operation of the control system has been described, some further details regarding the audio system will be described. Returning to FIG. 1, the telephone input TEL IN is brought in through an RJ11C modular jack and past a shunt varistor, an SOIV14K3, which is rated at 320 to 380 volts, and serves to keep transient voltages in check. Series resistors, illustratively 5 ohms, are connected between the varistor and the relay 20 in order to control current through the relay and transformer 50. The relay 20 is rated for 1500 volt peak contact-to-coil breakdown in accordance with Part 68 of the FCC rules. Transformer 50 also provides 1500 volts of peak isolation, per Part 68 requirements. An RF bypass capacitor is connected across the output terminals of the transformer, illustratively having a capacitance of 0.001 microF. A Zener diode is also coupled to each output terminal to provide further protection to the audio detector chips 300 and 400 (FIG. 3).

The amplifier 80 is a LM380-N8 fixed output audio amplifier, which is designed to boost the telephone circuit's nominal output of around −9 dBm to around 0 or +1 dBm, which is more suitable for on-air use. The input to amplifier 80 includes a filter to roll-off any audio above 3.5 KHz. A resistor, illustratively of 47K, is connected between the inverting and non-inverting inputs of amplifier 80 to add losses in the filter such that the audio voltage attenuation to the input of the amplifier is about 40 dB. This is needed because the audio voltage gain of the amplifier 80 is fixed at 50 dB. The output from amplifier 80 is coupled to the voice message line 82 through a blocking capacitor, illustratively 33 microF. A snubbing network is also connected to the output to prevent the amplifier 80 from being subjected to any possibility of parasitic oscillation.

Thus, a remotely activated EBS system has been described which makes use of an established data link—the telephone line and remote control—to initiate and perform an EBS activation. While the description has been carried out in regard to a preferred embodiment, various modifications may be made to the system without departing from the scope of the invention. For example, while relays have been used for manipulating the audio signals, other switching mechanisms could be used. Further, the system could be adapted either for standard four-wire operation, or for microwave operation. Indeed, the system could include a means for switching between the two. Further modifications may also be possible. The invention is not limited to the foregoing description, but rather includes all modifications and equivalents as may be found within the scope of the appended claims.

What is claimed is:

1. A remotely activated broadcast transmitter control for initiating and controlling a broadcast sequence of an emergency tone followed by a voice message on a transmitter normally controlled by a remote control; comprising in combination:

a telephone input for receiving a telephone signal, said telephone signal being selectively coupled to said remote control;

a first switch connected to said telephone input for switching said telephone signal between said remote control and an audio bus, the switching of said telephone signal to said audio bus generating an audio bus signal;

a program audio input for receiving a studio audio signal;

an audio output coupled to said transmitter for delivering any of a plurality of signals applied thereto to the transmitter;

a tone input for receiving said emergency tone;

a second switch connected to said audio bus, said program audio input and a second switch output, said second switch being switchable for selectively placing said audio bus signal and said studio audio signal on said second switch output;

a third switch connected to said second switch output, to said tone input, and to said audio output for selectively placing said emergency tone, said audio bus signal and said studio audio signal on said transmitter; and control electronics connected between said remote control and said first, second and third switches, said control electronics being responsive to a signal from said remote control to output control signals to said first, second, and third switches to sequentially place said telephone signal on said audio bus to generate said audio bus signal, to place said emergency tone on said transmitter, to place said audio bus signal on said transmitter, to place said studio audio signal on said transmitter, and to return said telephone signal to said remote control.

2. The transmitter control of claim 1, wherein said audio bus signal is the voice message.

3. The transmitter control of claim 2, wherein said audio bus includes an amplifier for amplifying said telephone signal to provide said voice message, said voice message being applied to said second switch via a voice message line connected between said amplifier and said second switch.

4. The transmitter control of claim 1, wherein said first, second and third switches are relays.

5. The transmitter control of claim 1, wherein said control electronics include a series of cascaded timers including outputs, the outputs of said timers being connected to a successive timer for triggering said successive timer.

6. The transmitter control of claim 5, and including a tone timer connected to said third switch for determining the duration of the emergency tone broadcast.

7. The transmitter control of claim 6, wherein said duration of said tone broadcast is switchable between 8 and 20 seconds.

8. The transmitter control of claim 1, wherein said control electronics include a flip flop, said flip flop being responsive to said signal from said remote control to output an initiation signal.

9. The transmitter control of claim 1, wherein said tone input is connected to an external tone generator.

10. The transmitter control of claim 9, and including an optoisolator coupled to said control electronics for activating said external tone generator.

11. The transmitter control of claim 1, wherein an isolation transformer is connected between said telephone input and said audio bus for passing said telephone signal to said audio bus.

12. The transmitter control of claim 1, wherein a dial-tone detector is connected to said audio bus for detecting dial-tone in said telephone signal and, in response thereto, for resetting said transmitter control.

13. The transmitter control of claim 12, wherein said dial-tone detector includes a timer to ensure a dial-tone of minimum duration.

14. The transmitter control of claim 13, wherein said timer of said dial-tone detector is set so that the minimum duration is half a second.

15. The transmitter control of claim 1, wherein a touch-tone detector is connected to said audio bus for detecting touch-tones in said telephone signal, said touch-tone detector being responsive to a proper off-code of touch-tones in said telephone signal for resetting said transmitter control.

* * * * *

UNITED STATES PATENT AND TRADEMARK OFFICE
CERTIFICATE OF CORRECTION

PATENT NO. : 5,528,674　　　　　　　　　　　　Page 1 of 2
DATED　　　 : June 18, 1996
INVENTOR(S) : Arthur B. Reis It is certified that error appears in the above-indentified patent and that said Letters Patent is hereby corrected as shown below:

ON THE TITLE PAGE:

item [19], "Reiss" should read -- Reis --.

[75] Inventor:

The last name of the inventor is misspelled. "Reiss" should read -- Reis --.

[56] References Cited

After "4,872,195 10/1989 Leonard ... 379/104" insert --

OTHER DOCUMENTS

"Automatic Changeover"; by James H. Greenwood; September 1, 1957 - Electronics; pages 138-142. --

UNITED STATES PATENT AND TRADEMARK OFFICE
CERTIFICATE OF CORRECTION

PATENT NO. : 5,528,674
DATED : June 18, 1996
INVENTOR(S) : Arthur B. Reis

It is certified that error appears in the above-indentified patent and that said Letters Patent is hereby corrected as shown below:

Column 9, line 63, "pulse," should read -- pulse. --;

Column 10, line 13, "results in the System" should read -- results in the system --.

Signed and Sealed this

Fifteenth Day of October, 1996

*Attest:*

BRUCE LEHMAN

*Attesting Officer*  *Commissioner of Patents and Trademarks*